United States Patent
Yoshida et al.

(10) Patent No.: US 6,342,269 B1
(45) Date of Patent: Jan. 29, 2002

(54) METHOD FOR MANUFACTURING CERAMIC-BASED COMPOSITE MATERIAL

(75) Inventors: Takashi Yoshida, Tokyo; Shigeto Nishide, Tanashi, both of (JP)

(73) Assignee: Ishikawajima-Harima Heavy Industries Co., Ltd., Tokyo (JP)

(*) Notice: Subject to any disclaimer, the term of this patent is extended or adjusted under 35 U.S.C. 154(b) by 0 days.

(21) Appl. No.: 09/536,761

(22) Filed: Mar. 28, 2000

(30) Foreign Application Priority Data

Jun. 25, 1999 (JP) .......................................... 11-179367

(51) Int. Cl.$^7$ .......................... C23C 16/00; C08G 77/60
(52) U.S. Cl. ............. 427/255.12; 427/900; 427/249.3; 528/35
(58) Field of Search ........................... 427/212, 255.12, 427/248.1, 230, 301, 249.1, 249.2, 249.3, 900; 264/603, 241; 252/182.11; 501/1; 528/35

(56) References Cited

U.S. PATENT DOCUMENTS

| | | | | |
|---|---|---|---|---|
| 4,804,731 A | * | 2/1989 | Hench et al. | 528/24 |
| 5,204,380 A | * | 4/1993 | Seyferth et al. | 522/148 |
| 5,665,848 A | * | 9/1997 | Barnard et al. | 528/24 |
| 5,877,104 A | * | 3/1999 | Bryson et al. | 501/88 |
| 6,133,396 A | * | 10/2000 | Laine et al. | 528/31 |

FOREIGN PATENT DOCUMENTS

| | | |
|---|---|---|
| EP | 0 781 737 A1 | 7/1997 |
| JP | 63-012671 | 1/1988 |
| WO | WO97/31064 | 8/1997 |

OTHER PUBLICATIONS

Yajima et al., Synthesis of Continuous SiC Fibers with High Tensile Strength, J. Am. Ceram., 1976, 59, 324–325.*
Laine et al., Preceramic Polymer Routes to Silicon Carbide, Chem. Mater., 1993, 5, 260–279.*

* cited by examiner

Primary Examiner—Shrive P. Beck
Assistant Examiner—William P. Fletcher, III
(74) Attorney, Agent, or Firm—Griffin & Szipl, P.C.

(57) ABSTRACT

A matrix formation process 10 is configured with CVI process 12 and PIP process 14, 15, 16 in which a co-polymer containing at least polycarboxysilane (PCS) and polymethylsilane (PMS) is applied. Crosslinking of each polymer is performed at an intermediate temperature which is lower than the pyrolysis temperature of the polymeres. Polymer impregnation process 15 for infiltrating the co-polymer into a matrix, and inert gas firing process 16 for firing the material at a high temperature in an inert gas atmosphere. In the crosslink process, the mixed polymer is held at about 573K to 723K for a predetermined time. The conversion ratio of the co-polymer crosslinked into SiC in the subsequent firing process is increased, efficiency of filling SiC in the PIP process is increased, and an airtight ceramic-based composite material can be manufactured efficiently within a short time.

2 Claims, 3 Drawing Sheets

PCS

PMS

METHOD FOR MANUFACTURING CERAMIC-BASED COMPOSITE MATERIAL

This application claims priority on Japanese Patent Application Number 179367/1999 filed Jun. 25, 1999, the entire disclosure of which is incorporated herein by reference.

BACKGROUND OF THE INVENTION

1. Techincal Field of the Invention

The present invention relates to a method for manufacturing a ceramic-based composite material, in which the conversion ratio of an organic silicon polymer to SiC is increased.

2. Prior Art

Ceramics are highly resistant to heat, but are brittle. Therefore, ceramic-based composite materials (Ceramic Matrix Ceramics: CMC) reinforced by ceramic fibers have been developed. When manufacturing CMC, a matrix formation process whereby a matrix is created between gaps of formed fiber fabric is configured with, for instance, a chemical vapor infiltration (CVI) process and a polymer impregnation and pyrolysis process (PIP).

In the CVI process, the material is processed with the vapor of a chemical substance, and a dense ceramics matrix is created on the surface of the fiber fabric. The PIP is a process whereby an organic silicon polymer is dissolved in a solvent such as xylene, and is impregnated into a fabric infiltrated with the chemical vapor and pyrolyzed in an inert gas, the fabric is fired at a high temperature to convert the organic silicon polymer into SiC.

A ceramic-based composite material that requires airtightness, used in, for example, a turbine blade, thrust chamber, or nozzle, must be filled completely with the matrix in the gaps between fibers of the CMC fabric by repeating the aforementioned PIP process.

However, according to such a conventional method for manufacturing ceramic-based composite materials, the conversion ratio from the organic silicon polymer into SiC during high-temperature is as low as 30 to 60%, therefore the PIP process must be repeated alternately by about 20 times, for instance. As a consequence, a fairly long time is required for repeated PIP processes, resulting in the low production efficiency of the ceramic-based composite material, as an undesirable practical problem.

SUMMARY OF THE INVENTION

The present invention was achieved to solve this problem. More explicitly, an object of the present invention is to offer a method for manufacturing a ceramic-based composite material by increasing the conversion ratio of an organic silicon polymer to SiC, increasing the infiltration efficiency of SiC in a PIP process, so that an airtight ceramic-based composite material can be manufactured efficiently within a short time.

Organic silicon polymers conventionally processed by the above-mentioned PIP process include, for example, polycarbosilane (PCS) and polymethylsilane (PMS). Polycarbosilane (PCS) is a polymer polymerized from its precursor, dimethylchlorosilane, however, because surplus H atoms and C molecules contained in PCS molecules are decomposed as hydrogen and methane in the initial period of the inert gas firing process, conventional conversion ratios to SiC are approximately 60%. In addition, polymethylsilane (PMS) is a polymer polymerized from its precursor, monomethylchlorosilane, but because PMS is a low-molecular-weight oligosilane, the conversion ratio to SiC is still lower, e.g., about 40% at maximum. In addition, the SiC produced contains much Si.

According to the present invention, polycarbosilane (PCS) and polymethylsilane (PMS) are mixed beforehand to protect a conventional organic silicon polymer from decomposition during the initial period of the inert gas firing process to make PCS and PMS crosslinked together, and the conversion ratio to SiC is increased.

In detail, according to the present invention, the method for manufacturing a ceramic-based composite material is configured with a fiber fabric formation process whereby the fiber fabric is formed with inorganic fibers, a fiber surface treatment process that forms a coating layer on the surface of the aforementioned fabric, and a matrix formation process in which a matrix is produced between the fibers; the above-mentioned matrix formation process is composed of a crosslink process in which a mixed organic polymer containing at least polycarbosilane (PCS) and polymethylsilane (PMS) is maintained for a predetermined time at an intermediate temperature which is lower than the firing temperature of the polymer, and PCS and PMS are crosslinked together, a PIP process in which the organic polymer is impregnated into the material, and an inert firing process whereby the material is fired at a high temperature in an environment with an inert gas, after the previous crosslink process.

According to this method, the polycarbosilane (PCS) and polymethylsilane (PMS), mixed in a polymer mixing process, are crosslinked in molecules together in the crosslink process, into a polymer with a Si—C rich skeleton. The subsequent loss during high-temperature firing in the inert gas is reduced, so the conversion ratio to SiC can be increased.

According to a preferred embodiment of the present invention, the mix of PCS and PMS is maintained at about from 573K to 723K for a predetermined time in the aforementioned crosslink process. An experiment using this method revealed that a conversion ratio to SiC of about 90% could be achieved.

Other objects and advantageous features of the present invention will be understood referring to the following description with reference to the attached drawings.

BRIEF DESCRIPTION OF THE DRAWINGS

FIG. 2A for polycarbosilane (PCS) and FIG. 2B for polymethylsilane (PMS).

DESCRIPTION OF PREFERRED EMBODIMENTS

Figure 1:
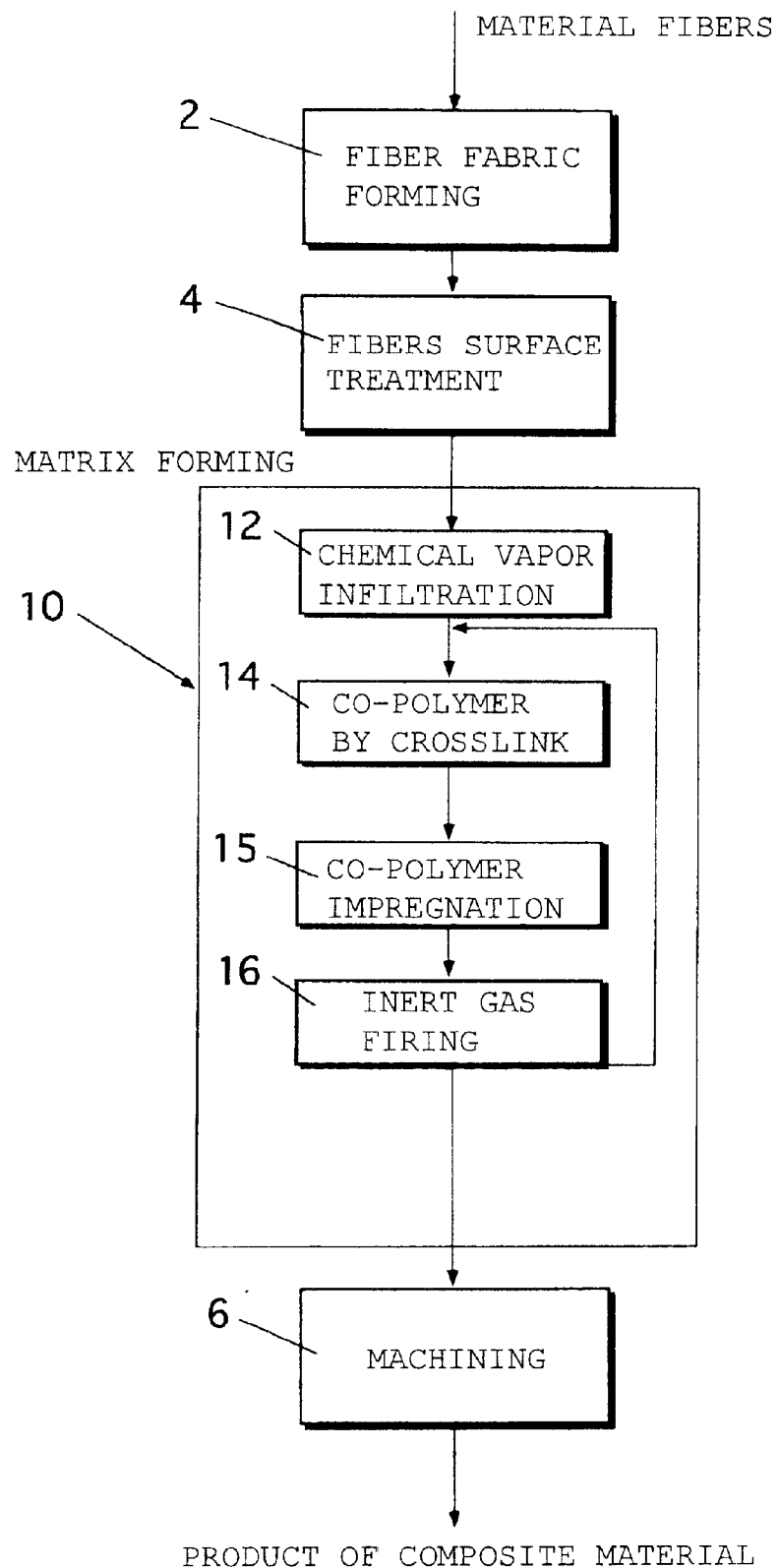
FIG. 1 is a flow chart that shows a method for manufacturing a ceramic-based composite material according to the present invention.

Preferred embodiments of the invention are explained as follows referring to the drawings.

FIG. 1 is a flow diagram showing the method for manufacturing a ceramic-based composite material according to the present invention. As shown in FIG. 1, the method of the invention is provided with fiber fabric formation process 2, fiber surface treatment process 4, matrix formation process 10, and machining process 6.

In fiber fabric formation process 2, a fiber fabric with a predetermined shape is formed using SiC fibers. Preferred structures completed in this process include three-dimensional ones applicable to the component parts of a gas turbine, such as a turbine blade, thrust chamber, and afterburner component, but a planar shape can also be formed.

In fiber surface treatment process 4, carbon (more preferably, graphite carbon) or BN is coated on the formed fiber fabric. A preferred thickness of coating is from 0.1 to 1.0·m. The coating layer plays a role of separating matrix from fibers and enhancing the toughness of fibers, as disclosed in the unexamined Japanese patent publication No. 12671/1988.

Machining process 6 is a process in which the ceramic-based composite material completed in matrix formation process 10 to be detailed later is mechanically processed and surface ground into the preferred gas turbine component part. In this process, the material is machined into a predetermined shape using, for example, a diamond grindstone.

As shown in FIG. 1, matrix formation process 10 further includes chemical vapor infiltration process 12, polymer impregnation process 15, co-polymer by crosslink 14, and inert gas firing process 16.

In chemical vapor infiltration process 12, a CVI (chemical vapor infiltration) method is used; a fabric fixed in an oven using a dedicated jig is heated, methyltrichlorosilane is introduced in an evacuated environment, and SiC is synthesized. The targeted volumetric ratio of synthesized SiC is normally about 0.2.

The mixing ratio of polycarbosilane (PCS) and polymethylsilane (PMS) is selected preferably to increase the conversion ratio to SiC, for instance, the ratio in terms of weight is set at from 1:1 to 2:1.

In co-polymer by crosslink process 14, the material is maintained at an intermediate temperature that is lower than the firing temperature for a predetermined time, to crosslink PCS and PMS. In this process 14, the material should preferably be kept between about 573K and about 723K.

In polymer impregnation process 15, an organic polymer manufactured in the process 14 is impregnated into the fabric processed by the CVI method, after dissolving the polymer in a solvent etc. The product of this polymer impregnation process is the fabric impregnated with the organic polymer manufactured in process 14.

Next, in inert firing process 16, the fabric impregnated with the organic polymer is fired at a high temperature of up to about 1,200° C. in an inert gas atmosphere (for instance, nitrogen gas), to convert the organic silicon polymer into SiC. Polymer impregnation process 15 and inert gas firing process 16 are applied alternately until the gaps between fibers of the fabric are filled with SiC, for example, for four to five times, approximately.

Figure 2A:
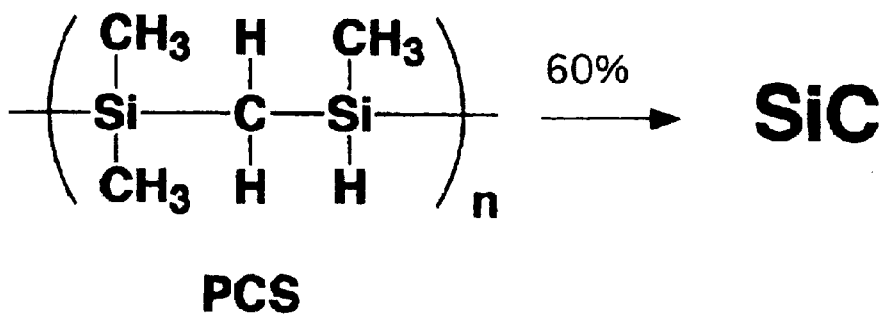
FIGS. 2A and 2B show molecular structures of organic polymers used in the method of the present invention.
Figure 2B:
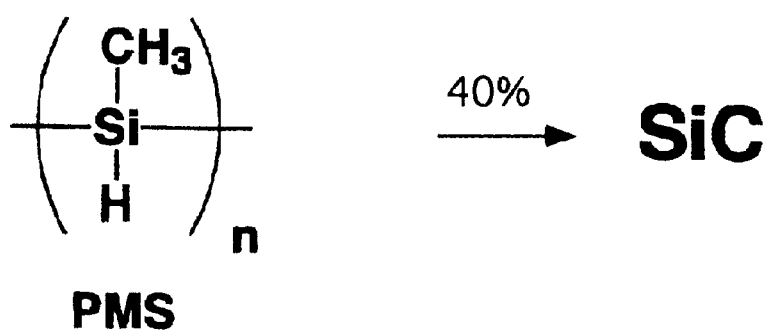

FIGS. 2A and 2B show molecular structures of organic polymers used in the method of the invention, i.e., polycarbosilane (PCS) and polymethylsilane (PMS), respectively, which are used individually according to conventional methods. Polycarbosilane (PCS) is a polymer polymerized from its precursor, dimethylchlorosilane. However, the conversion ratio to SiC is as low as about 60% even at maximum. Polymethylsilane (PMS) is polymerized from its precursor monomethylchlorosilane, but because PMS is a low-molecular-weight oligosilane, its conversion ratio to SiC is still lower, that is, about 40% at maximum.

Figure 2C:
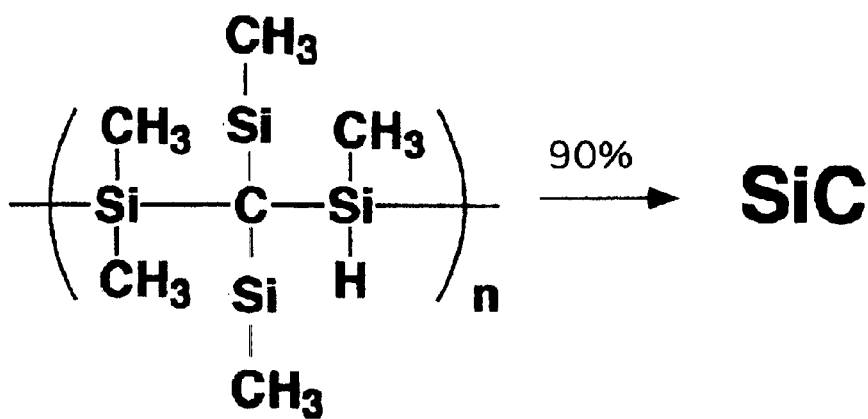
FIG. 2C shows the molecular structure of a mixed organic polymer according to the present invention.

The co-polymer produced in polymer mixing process 13 according to the present invention is merely a mixture of polycarbosilane (PCS) and polymethylsilane (PMS). However, by the subsequent process 14, PCS and PMS are molecular bonded together (linked) into a polymer with a high Si-C content skeleton as typically shown in FIG. 2C, according to theoretical studies so far. As a result, the conversion ratio to SiC is increased to more than about 90%.

Figure 3:
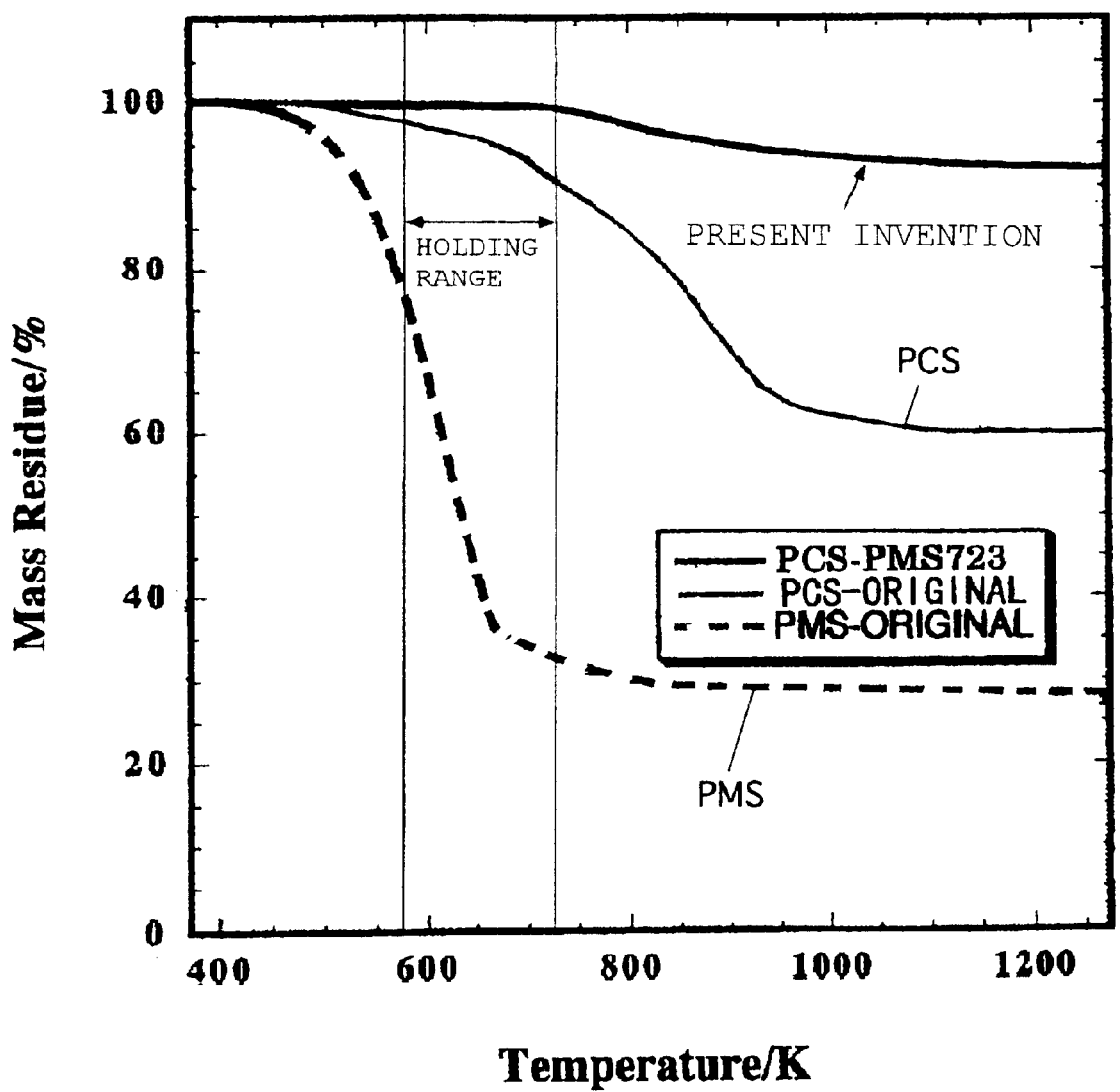
FIG. 3 shows an embodiment of the method of the invention.

FIG. 3 shows an embodiment of the method according to the invention. In FIG. 3, the abscissa shows temperatures increased from 500° C. to about 1,300° C., and the ordinate shows mass residues of the organic silicon polymer. The three lines drawn in FIG. 3 represent the method of the present invention with a solid line, the method using PCS with a fine solid line, and the use of PMS with a broken line. The same temperature rises were applied to all three types.

From FIG. 3, mass residues, that is, conversion ratios to SiC at 1,200° C. or more are about 60% when PCS was used and about 35% using PMS, but according to the method of the invention, the ratio is more than about 90%. This explicates the effects in crosslink process 14 as described before.

Hence, the method for manufacturing a ceramic-based composite material according to the present invention increases the conversion ratio of an organic silicon polymer to SiC, enhances the SiC-filling efficiency in the inert gas firing process, and efficiently manufactures the ceramic-based composite material with airtightness within a short time.

The invention can be modified in various ways, which are not limited within the embodiment of the invention, as far as there is no deviation from the claims of the present invention. For example, an organic polymer such as PVS (polyvinylsilane) can also be used with the same expected effects.

What is claimed is:

1. A method for manufacturing a ceramic-based composite material, comprising the following steps:

forming a fiber fabric from inorganic fibers;

forming a coating layer on a surface of the fabric;

forming a matrix between the fibers of the fabric, wherein the step of matrix forming includes heating the fabric in the presence of methyltrichlorosilane by chemical vapor infiltration to form silicon carbide, forming a co-polymer by mixing at least two different organic polymers to form mixed organic polymers wherein the at least two organic polymers include polycarbosilane (PCS) and polymethylsilane (PMS) and crosslinking the mixed organic polymers by holding the mixed organic polymers for a predetermined time at an intermediate temperature which is lower than a firing temperature sufficient to form silicon carbide, impregnating the co-polymer into the fabric to form an impregnated fabric, and firing the impregnated fabric in an inert gas environment at the firing temperature.

2. A method for manufacturing a ceramic-based composite material as recited in claim 1, wherein the crosslinking occurs at the intermediate temperature of about 573° K. to 723° K.

\* \* \* \* \*